United States Patent
Chung et al.

(10) Patent No.: US 12,392,941 B2
(45) Date of Patent: Aug. 19, 2025

(54) SURFACE LIGHT SOURCE PROJECTION DEVICE WITH IMPROVED ZERO-ORDER DIFFRACTION

(71) Applicant: Guangzhou Tyrafos Semiconductor Technologies Co., Ltd., Guangzhou (CN)

(72) Inventors: Jun-Wen Chung, Tainan (TW); Hsu-Wen Fu, Kaohsiung (TW); Lu-Lang Hsu, Hsinchu County (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 673 days.

(21) Appl. No.: 17/841,709

(22) Filed: Jun. 16, 2022

(65) Prior Publication Data
US 2023/0341598 A1    Oct. 26, 2023

(30) Foreign Application Priority Data
Apr. 20, 2022    (TW) .................................. 111115087

(51) Int. Cl.
*G02B 5/18*     (2006.01)
*G02B 27/42*    (2006.01)
*G01S 7/481*    (2006.01)

(52) U.S. Cl.
CPC ....... *G02B 5/1866* (2013.01); *G02B 27/4272* (2013.01); *G01S 7/4814* (2013.01)

(58) Field of Classification Search
None
See application file for complete search history.

(56) References Cited

U.S. PATENT DOCUMENTS

| | | | | |
|---|---|---|---|---|
| 12,099,216 B2 * | 9/2024 | Chung | ................. | G02B 5/0252 |
| 2012/0223218 A1 * | 9/2012 | Miyasaka | ........... | G02B 27/4266 |
| | | | | 359/558 |
| 2019/0243155 A1 * | 8/2019 | You | ..................... | G02B 27/4233 |
| 2020/0278562 A1 * | 9/2020 | Huang | ................. | H04N 13/254 |
| 2021/0181390 A1 * | 6/2021 | Liu | ..................... | G02B 27/4272 |
| 2023/0314673 A1 * | 10/2023 | Chang | ................. | G02B 5/0221 |
| | | | | 359/569 |

* cited by examiner

*Primary Examiner* — Derek S. Chapel (57) ABSTRACT

A surface light source projection device with improved zero-order diffraction includes a light exit module and a diffractive optical module. The diffractive optical module has two micron diffraction layers, the micron diffraction layers include a plurality of microstructures. Each of the microstructures has a circular perimeter and is provided with a recess having an opening inside the circular perimeter. The outer diameter of each of the microstructures is between 5 times and 200 times the incident wavelength of an incident light beam, and the outer diameter of the recess is between 0.3 and 0.7 times the outer diameter of each microstructure.

10 Claims, 11 Drawing Sheets

SURFACE LIGHT SOURCE PROJECTION DEVICE WITH IMPROVED ZERO-ORDER DIFFRACTION

CROSS-REFERENCE TO RELATED APPLICATION

This application claims the priority of Taiwanese patent application No. 111115087, filed on Apr. 20, 2022 which is incorporated herewith by reference.

BACKGROUND OF THE INVENTION

1. Field of the Invention

The present invention relates generally to a surface light source projection device with improved zero-order diffraction, applicable to a Time-of-Flight (ToF) device, and more particularly, to a surface light source projection device comprising a microstructure provided with recesses.

2. The Prior Arts

In recent years, with the evolution of the electronic industry and the vigorous development of industrial technology, various electronic devices are mostly developed and designed in the direction of being light and easy to carry, so that users can carry out mobile business or entertainment anytime and anywhere. Among these technologies and products, 3D sensing technology is gradually driving the trend due to the successful application of interactive game consoles, and 3D sensing technology can also be applied to close-range face or object recognition, medium-range AR/VR applications, building indoor detection and the optical radar and long-range object telemetry required for autonomous driving, which have led to the vigorous development of various 3D sensing technologies. The currently well-known 3D technologies are stereo vision sensing, time-of-flight ranging sensing, and structured light sensing measurement.

Wherein, the time-of-flight ranging sensing technology is to obtain a plurality of distance value distributions through the time difference between the emission time of the light source and the time of receiving the feedback light to establish a three-dimensional scanning result. At present, the mainstream emission light sources on the market for time-of-flight ranging sensing technology can be divided into collimated light systems and surface light source systems, for example, Vertical Cavity Surface Emitting Laser (VCSEL), but because the collimated light system consists of a light source that forms collimated light through a light collimating lens set consisting of at least two lenses, and then projects hundreds to tens of thousands of light spots through diffractive elements. The projection distance of the light spots and the luminous power of the light source are directly proportional, which is suitable for short-range to long-range applications. However, this will increase the thickness of the surface light source projection device, which is not suitable for the thinning of mobile devices. The use of surface light source systems is the most suitable as the emission light source for mobile devices. But the projection distance is limited by the luminous power, and the application can only be limited to short and medium ranges.

However, the light emitted by the surface light source projection device needs to be diffused and scattered by a diffusing sheet or a diffractive sheet to increase the angular range of light projection to cover the field of view of the three-dimensional scanning device. As the current diffuser or diffractive film is made of polymer material embossing, when used in conjunction with the laser light source in the surface light source projection device, there is a problem of heat accumulation, especially in some special environments that require to use short-wavelength lasers (blue lasers or violet lasers), and the polymer materials are more likely to absorb these wavelengths, resulting in deterioration and deformation of the material structure, thus losing the capability of light diffusion or light diffraction. Also, the light energy is strong, and if it is continuously irradiated on the plastic structure, it may cause hazards such as thermal accumulation and fire of the plastic structure, and these problems are difficult to prevent and monitor through changes in physical properties. Therefore, how to provide a stable, safe and effective beam diffusing sheet diffuser or diffractive elements is an urgent problem to be solved.

However, by using the diffuser, although a light beam of light can be projected uniformly and the collimation requirement of the light source is not high, there are three problems in usage. First, it will destroy the polarization of light. Second, the use efficiency of light is poor. Third, it will destroy the directivity of light. It is only suitable for short and medium range projection and general sensing. On the other hand, the diffractive element projects a light beam of light into hundreds to tens of thousands of spots, so the light source of the diffractive element has high requirements for alignment, and the poorly designed diffractive element will have serious zero-order light spot. However, the diffractive element has the advantages of high utilization efficiency of light and can maintain the polarization and directivity of light, so it is suitable for short- to long-range sensing and helps to maintain light polarization.

Furthermore, for the aforementioned surface light source projection device utilizing the diffuser or diffractive sheet, the brightness of the zero-order light spot formed by the diffracted light is usually much larger than that of other light spots, thereby limiting the application of such a surface light source projection device. For example, when using the time-of-flight ranging sensing technology to calculate the depth of an object, since the brightness of the zero-order light spot affects the intensity of the surrounding light spots, the system cannot accurately identify the depth around the zero-order light spot, which is easy to cause errors in depth calculation.

In view of the aforementioned shortcomings, the present invention is provided to address these issues.

SUMMARY OF THE INVENTION

A primary objective of the present invention is to provide a surface light source projection device, which has a diffractive optical element module, the diffractive optical element module has two micron diffraction layers, and the micron diffraction layers include a plurality of microstructures, wherein the microstructures are provided with a first recess, the total outer diameter of the microstructures is between 5 times and 200 times the incident wavelength of an incident light beam, and the first outer diameter of the first recesses is between 0.3 and 0.7 times the total outer diameter; thus, the effect of reducing the zero-order diffraction intensity of the diffraction pattern formed by the diffracted light is achieved, so that the light spot of the diffraction pattern has the advantages of uniform light intensity and high density to realize long-range sensing.

Another objective of the present invention is to provide a surface light source projection device, applicable to timeof-flight ranging sensing technology and withstands heat accumulation after high-energy laser irradiation, so as to facilitate long-term irradiation and long-range sensing, also suitable for image sensing in special environments with light-resistant deterioration under short-wavelength laser irradiation.

In order to achieve the above objectives, the present invention provides a surface light source projection device, comprising: a diffractive optical element module, having a light incident surface and a light exit surface, and the diffractive optical element module being disposed with two micron diffraction layers, the micron diffraction layers comprising a plurality of microstructures, the microstructures being shaped conical, disc-shaped or any combination of the above, and the microstructures having a height and a total outer diameter; a light exit module, for outputting a collimated beam, the light beam having an incident wavelength, and the light beam incident on the light incident surface of the diffractive optical element module, and the diffractive optical module outputting a diffracted light from the light exit surface after the light beam has passed through the diffractive optical element module; wherein, a first recess is disposed on the microstructures, and the first recess has a first depth and a first outer diameter, and the total outer diameter of the microstructures is between 5 times and 200 times the incident wavelength, and the first outer diameter of the first recess is between 0.3 and 0.7 times the total outer diameter.

Preferably, according to the diffraction element of the surface light source projection device of the present invention, the height of the microstructures is between 0.05 times to 0.2 times the total outer diameter, and the first depth of the first recess is between 0.3 and 0.7 times the height.

Preferably, according to the diffraction element of the surface light source projection device of the present invention, the distance between the two microstructures is between 0.5 times and 5 times the total outer diameter.

Preferably, according to the surface light source projection device of the present invention, the microstructures further include a second recess, the second recess is disposed in the first recess, and the second recess has a second depth and a second outer diameter, the second outer diameter of the second recess is between 0.3 and 0.7 times the first outer diameter, and the second depth of the second recess is between 0.3 and 0.7 times the first depth.

Preferably, according to the surface light source projection device of the present invention, the diffractive optical element module comprises a substrate, the micron diffraction layers are disposed on the substrate, and the microstructures and the substrate are formed integrally by dry etching, and the material of the diffractive optical element module is transparent crystal or glass.

Preferably, according to the surface light source projection device of the present invention, the micron diffraction layers are respectively a first micron diffraction layer and a second micron diffraction layer.

Preferably, according to the surface light source projection device of the present invention, the first micron diffraction layer is disposed on the light incident surface of the diffractive optical element module, and the second micron diffraction layer is disposed on the light exit surface of the diffractive optical element module.

Preferably, according to the surface light source projection device of the present invention, the diffractive optical element module comprises: a first diffractive optical element, the first diffractive optical element having a first upper surface and a first lower surface; and a second diffractive optical element, the second diffractive optical element having a second upper surface and a second lower surface; wherein, the first micron diffraction layer is disposed on the first upper surface of the first diffractive optical element, the second micron diffraction layer is disposed on the second diffractive optical element, the light beam is incident on the diffractive optical element module from the first lower surface, and passes through the diffractive optical element, and then exits as the diffracted light from the second upper surface.

Preferably, according to the surface light source projection device of the present invention, the second micron diffraction layer is disposed on the second lower surface.

Preferably, according to the surface light source projection device of the present invention, the second micron diffraction layer is disposed on the second upper surface.

The surface light source projection device provided by the present invention mainly utilizes a first recess disposed on the microstructure, and the total outer diameter of the microstructure is between 5 times and 200 times the incident wavelength of the light beam, and the first outer diameter of the first recess is between 0.3 and 0.7 times the total outer diameter, which achieves the effect of reducing the zero-order diffraction intensity of the diffraction pattern formed by the diffracted light, so that the light beam passes through the diffractive optical element module will generate diffracted light with uniform light intensity and a high density of dot matrix. In addition, the two micron diffraction layers of the present invention are formed by dry etching, and the material of the diffractive optical element module is transparent crystal or glass, so that the present invention provides a surface light source projection device suitable for the time-of-flight ranging sensing technology and resistant to heat accumulation caused by high-energy laser irradiation, to facilitate long-term irradiation and long-range sensing, and also suitable for image sensing in special environments where short-wavelength laser irradiation is resistant to photo-degradation, with wide applicability and high stability.

In order to make those skilled in the art understand the purpose, features and effects of the present invention, the present invention is described in detail as follows by means of the following specific embodiments and in conjunction with the accompanying drawings.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

Figure 1:
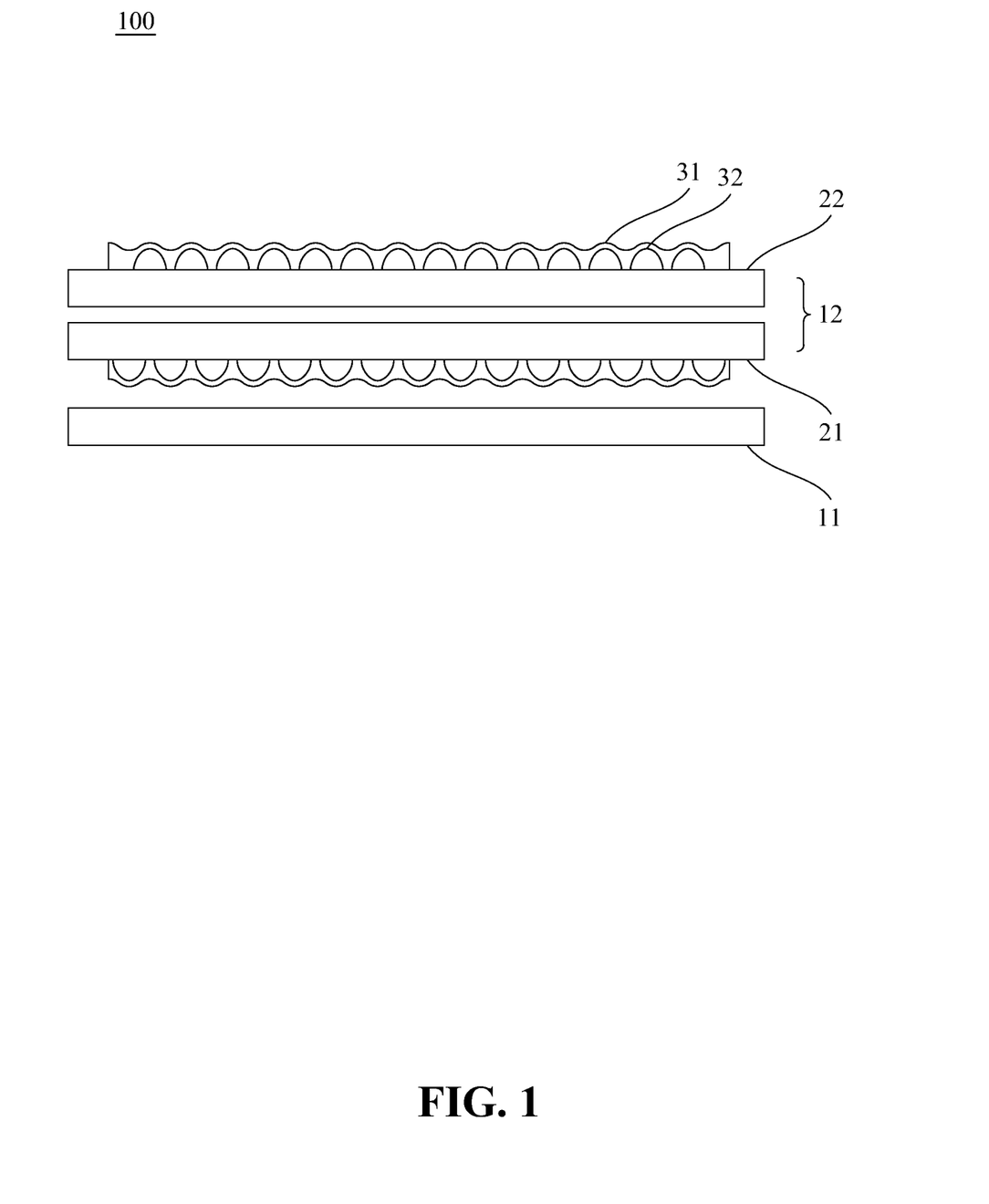
FIG. 1 is a schematic view of a surface light source projection device according to the present invention.

Referring to FIG. 1, FIG. 1 is a schematic view of a surface light source projection device according to the present invention. As shown in FIG. 1, the surface light source projection device 100 according to the present invention includes a light exit module 11 and a diffractive optical element module 12.

Figure 2:
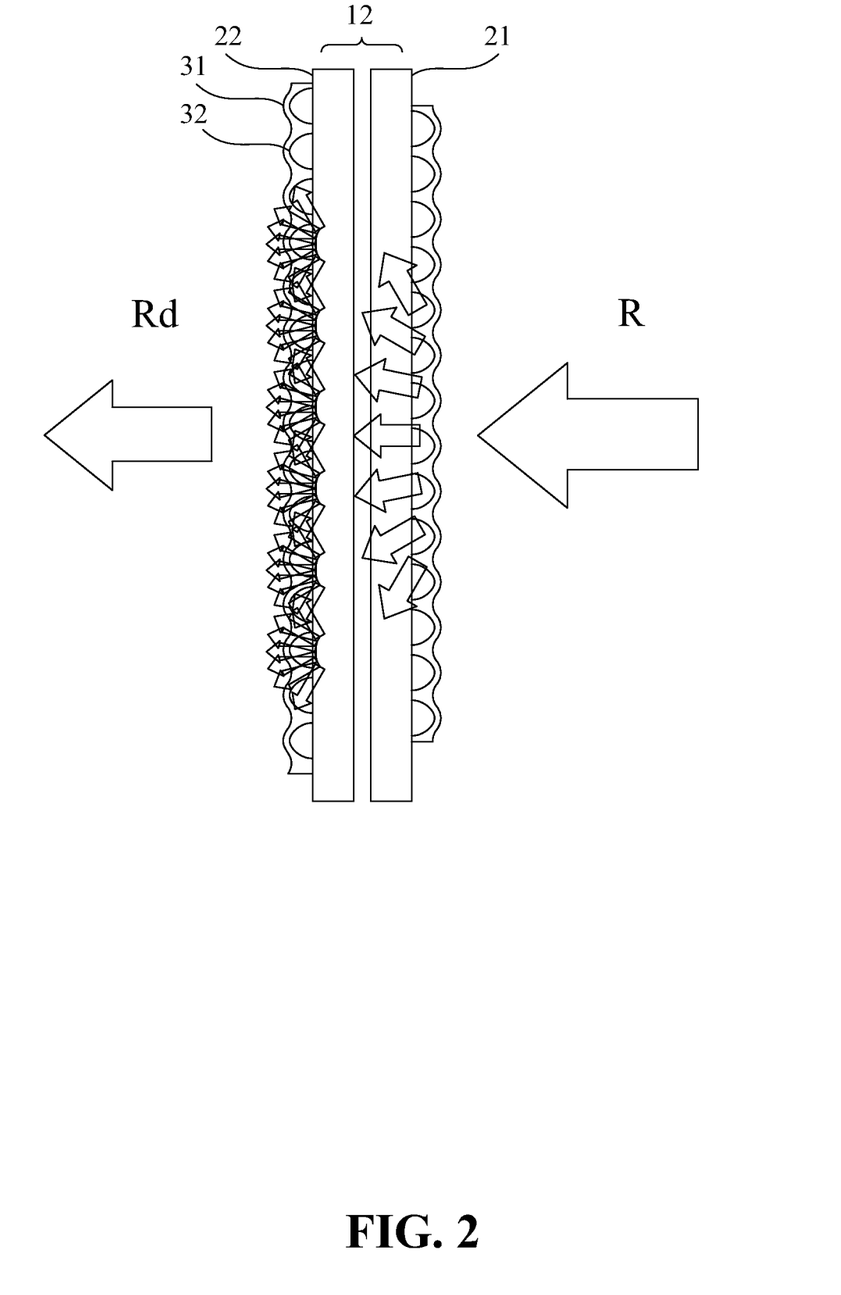
FIG. 2 is a schematic view illustrating that the light exit module of the present invention emits incident light to the diffractive optical element module.

Also refer to FIG. 2. FIG. 2 is a schematic view illustrating that the light exit module of the present invention emits incident light to the diffractive optical element module. As shown in FIG. 2, the light exit module 11 is used to output a light beam R, the light beam R has a specific incident wavelength, and the light beam R can be a light beam with a high degree of directivity. In some embodiments, the light exit module 11 may be a vertical-cavity surface-emitting laser (VCSEL) module capable of emitting multiple beams simultaneously. In other embodiments, the light exit module 11 may also be an edge-emitting laser diode module capable of emitting a single beam, a collimated light exit diode (LED) module or other suitable light sources, and the number of light sources may be one or more, but the present invention is not limited thereto.

Figure 3:
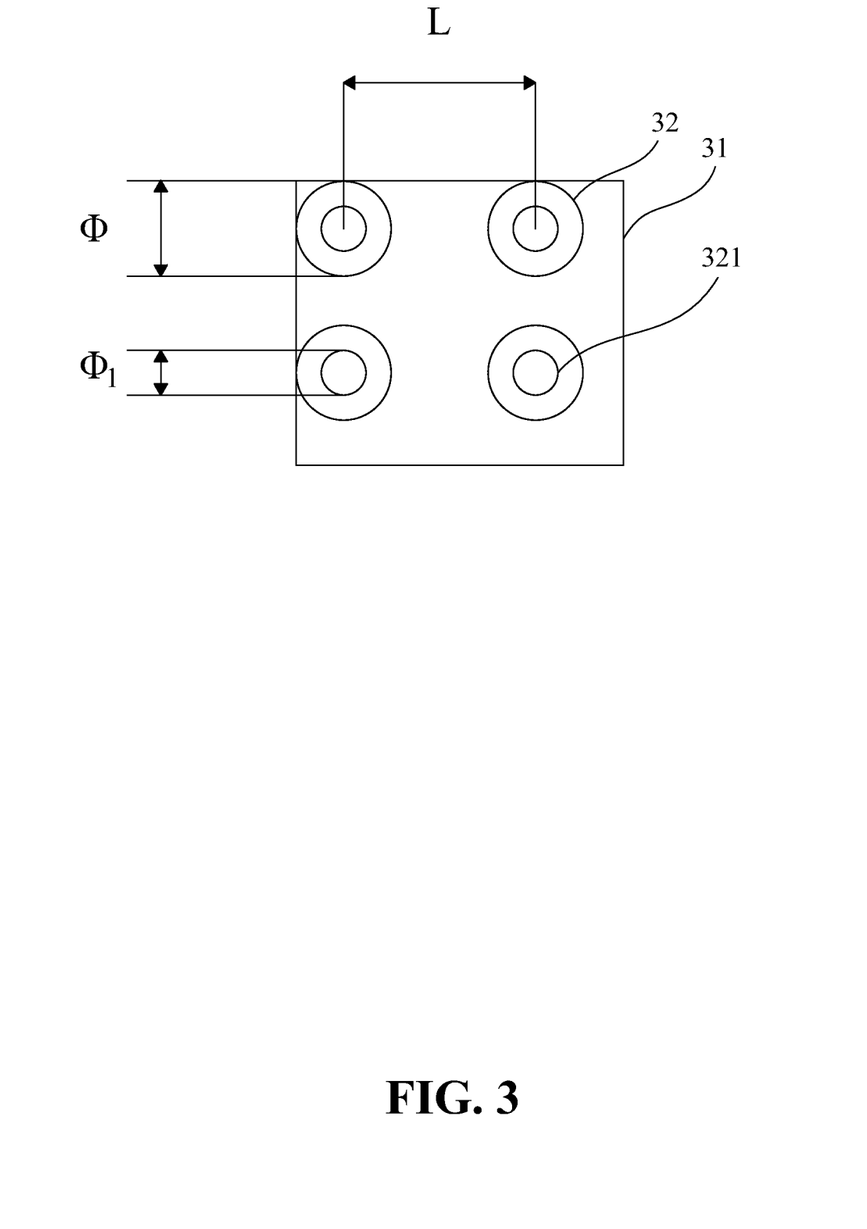
FIG. 3 is a schematic view of a microstructure according to the present invention.

Refer to FIG. 2 and FIG. 3. FIG. 3 is a schematic view of a microstructure according to the present invention. The diffractive optical element module 12 is used for the light beam R to pass through to form diffracted light Rd to be projected outwards. The diffractive optical element module 12 has a light incident surface 21 and a light exit surface 22. The light incident surface is used to receive the light beam R, and the light exit surface 22 is used to output the diffracted light Rd, wherein the diffractive optical element module 12 has two micron diffraction layers 31, and the micron diffraction layers 31 have a plurality of microstructures 32. The total outer diameter $\phi$ of the microstructures 32 is between 5 times and 200 times the incident wavelength of the light beam R.

It should be further explained that the total outer diameter $\phi$ of the microstructure 32 can be used to adjust the spot density of the diffraction pattern formed by the diffracted light Rd. When the total outer diameter $\phi$ is larger, the lower the spot density of the diffraction pattern formed by the diffracted light Rd will be, but the advantage is that the diffraction pattern formed by the diffracted light Rd has a larger range, and 3D sensing can be realized on the surface light source projection device 100 with a smaller size. However, the disadvantage is that the spot density is low. In this case, it is difficult to realize long-range sensing. On the other hand, when the total outer diameter ϕ is smaller, the spot density of the diffraction pattern formed by the diffracted light Rd is higher. However, the disadvantage is that an excessively small total outer diameter ϕ will result in an excessively small range of diffraction patterns, making it difficult to reduce the size of the surface light source projection device 100, which does not meet practical application requirements.

Specifically, in some embodiments, the shape of the microstructures 32 in the present invention can be configured as a cone, a disc, or a combination of any of the above. It should be further explained that the total outer diameter ϕ referred to in the present disclosure can be a representation of the width of any microstructure 32. When the microstructure 32 is disc-shaped, the total outer diameter ϕ can be the outer diameter of the microstructure 32. When the microstructure 32 is not disc-shaped, the total outer diameter ϕ can be represented by the outer diameter of the cylindrical structure closest to the microstructure 32, but the invention is not limited thereto. In the preferred embodiment of the present invention, the disk-shaped, cone-shaped or preferred embodiment of the present invention, the disc-shaped, cone-shaped cylindrical microstructure 32 has a circular perimeter with the total outer diameter ϕ.

Specifically, referring to FIG. 2 and FIG. 3, the microstructure 32 in the present invention is disposed with a first recess 321 inside the circular perimeter. As shown in FIG. 3, the first recess 321 is an inner recess with an opening having a diameter ϕ1 as the first outer diameter of the first recess 321, and the first outer diameter ϕ1 of the first recess 321 is between 0.3 and 0.7 times the total outer diameter ϕ. It should be further explained that the intensity distribution of diffracted light calculated by Fraunhofer diffraction theory shows that the brightness of the light spot generated by the zero-order diffraction of diffracted light Rd is usually much larger than that of other light spots. However, in the present invention, with the design that the microstructure 32 is provided with the first recess 321 and the first outer diameter ϕ1 of the first recess 321 is between 0.3 and 0.7 times the total outer diameter ϕ, it can effectively prevent the problem that the single zero-order light of the laser beam of the conventional surface light source device is too bright and affects the performance of the subsequent diffraction pattern. In some embodiments, the first outer diameter ϕ1 of the present invention is preferably 0.5 times the total outer diameter ϕ. In terms of process accuracy, the process precision of the size that the first outer diameter ϕ1 is 0.5 times the total outer diameter #can be more accurate, which greatly improves the stability and reliability of the present invention, but the present invention is not limited thereto. Furthermore, the microstructure 32 of the micron diffraction layer 31 according to the present invention can be formed by dry etching from a single material, so that the appearance and shape of the microstructure 32 can be effectively controlled, and the microstructures 32 with recesses 321 can also be effectively formed, which is very convenient for mass production and can quality control.

Thereby, according to the surface light source projection device 100 of the present invention, the original light beam R is converted into the diffracted light Rd by the diffractive optical element module 12, and in conjunction with the disposition of the microstructure 32 and the recess 321, wherein the total outer diameter ϕ of the microstructure 32 is between 5 times and 200 times the incident wavelength of the light beam R, and the first outer diameter ϕ1 of the first recess 321 is between 0.3 and 0.7 times the total outer diameter ϕ, the effect of reducing the zero-order diffraction intensity of the diffraction pattern formed by the diffracted light Rd is achieved, so that the light spot of the diffraction pattern has the advantages of uniform light intensity and high density, so as to realize long-range sensing.

It is worth mentioning that the diffractive optical element module 12 of the present invention must have two micron diffraction layers 31. The reason is that when only a single micron diffraction layer 31 is used in the diffractive optical element module 12, the spot density of the diffraction pattern formed by the diffracted light Rd on the small-sized surface light source projection device 100 is insufficient to cover the projection range of a large area. It also causes a significant drop in the accuracy of long-range sensing. Therefore, in the present invention, the diffracted light Rd forms a diffraction pattern with a high-density dot matrix by using two micron diffraction layers 31. It should be noted that the use of the diffractive layers 31 is not limited to two layers, and the aforementioned actual manufacturing process is only used for illustration and is not intended to limit the present invention.

Specifically, in some embodiments, the height of the microstructures 32 is between 0.05 to 0.2 times the total outer diameter ϕ, and the first depth of the first recess 321 is between 0.3 to 0.7 times the height. It should be further noted that the height of the microstructure 32 and the first depth of the first recess 321 can be used to adjust the light intensity uniformity of the light spot of the diffraction pattern formed by the diffracted light Rd. The reason is that the height and the first depth in conjunction with the total outer diameter ϕ and the first outer diameter ϕ1 will affect the diffraction factor and interference factor of the diffracted light Rd, which will change the light intensity uniformity of the light spot of the diffraction pattern. It can be understood that when the height of the microstructure 32 is too small or the first depth of the first recess 321 is too large, the light beam R cannot form the diffracted light Rd after passing through the diffractive optical element module 12. In addition, in the actual process, the higher the height of the microstructures 32 is, the lower the uniformity of the crystals of the microstructures 32 will be, thereby further affecting the light intensity uniformity of the light spot of the diffraction pattern formed by the diffracted light Rd. It should be noted that the above-mentioned actual manufacturing process is only used for illustration, and is not to limit the present invention.

Specifically, in some embodiments, the distance L between the two microstructures 32 can be changed to adjust the range of the diffraction pattern formed by the diffracted light Rd, wherein, when the distance L is larger, the larger the range of the diffraction pattern formed by the diffracted light Rd will be; on the other hand, when the distance L is smaller, the smaller the range of the diffraction pattern formed by the diffracted light Rd will be. It can be understood that, the user can choose the appropriate spacing L to match the total outer diameter ϕ of the microstructure 32 depending on the application. It is worth mentioning that, in the preferred embodiment of the present invention, the distance between the two microstructures 32 must be between 0.5 times and 5 times the total outer diameter ϕ. The reason is that when the distance between the two microstructures 32 is less than 0.5 times of r, the range of the diffraction pattern formed by the diffracted light Rd will be too small, which does not meet the needs of practical applications. On the other hand, when the distance L is increased in order to improve the range of the diffraction pattern formed by the diffracted light Rd, since the total outer diameter φ is too small compared to the distance L, the light beam R cannot form the diffracted light Rd after passing through the diffractive optical element module 12.

Thereby, the surface light source projection device 100 of the present invention adjusts the height H and the spacing L of the microstructure 32, and adjusts the first depth D1 of the first recess 321 to further strengthen the diffracted light Rd. The intensity uniformity and spot density of the diffraction pattern improves the stability and accuracy of long-range sensing, and realizes a dot matrix diffraction pattern with a wide range and high light intensity uniformity. Moreover, the microstructure 32 also has good optical characteristics to satisfy the practical application requirements.

It is worth mentioning that, in some embodiments, the microstructures 32 of the micron diffraction layer 31 of the present invention are arranged in the hexagonal close packed arrangement, and the hexagonal close packed arrangement is the arrangement with the highest space utilization rate. As such, by arranging the microstructures 32 in the hexagonal close packed arrangement, the spot density of the diffraction pattern formed by the diffracted light Rd is further increased, and the accuracy of long-range sensing is greatly improved, but the present invention is not limited thereto.

It is worth mentioning that, compared with the optical structures formed of organic materials in the prior art, the microstructures 32 of the embodiments of the present invention are not prone to cracking or decomposition, and are also resistant to physical friction. The micron diffraction layer 31 may have stable optical properties. In addition, in some embodiments, the material of the micron diffraction layer 31 may include transparent crystal or glass, such as sapphire or quartz. Specifically, sapphire has properties such as high hardness, high melting point, and high refractive index. The Mohs hardness of sapphire is 9, which is a material with high hardness and wear resistance, so the microstructure 32 of the micron diffraction layer 31 is not easily damaged. Furthermore, the melting point of sapphire is higher than 2000 degrees Celsius and has good thermal conductivity, so even if it is irradiated by a light source for a long time, it is not easily deformed, which helps the micron diffraction layer 31 to maintain stable optical properties. In addition, since the lattice stacking of sapphire is also a hexagonal system, in some embodiments, it can be used in conjunction with the microstructures 32 that are in hexagonal close packed arrangement to further enhance the light spot of the diffraction pattern formed by the diffracted light Rd density; however, the present invention is not limited thereto.

Specifically, in some embodiments, the micron diffraction layers 31 may be disposed on the light incident surface 21 and the light exit surface 22 of the diffractive optical element module 12, respectively. In other embodiments, the diffractive optical element module 12 may further include a first diffractive optical element and a second diffractive optical element, wherein the first diffractive optical element is provided with a first micron diffraction layer, and the second diffractive optical element is provided with a second micron diffraction layer. As such, through the arrangement of the two layers of optical elements, the user can adjust the angle between the optical elements according to the application, so as to control the diffraction pattern and the spot density formed by the diffracted light Rd, and greatly improve the surface light source of the present invention and the application range, which makes the present invention have wide applicability, but the present invention is not limited thereto.

As such, the present invention further improves the spot density of the diffraction pattern formed by the diffracted light Rd by adjusting the arrangement of the microstructures 32 of the micron diffraction layers 31, thereby greatly improving the accuracy of long-range sensing, and also, the arrangement of the two layers of optical elements make the present invention have wide applicability.

First Embodiment

Hereinafter, an embodiment of the first embodiment of the surface light source projection device 100 of the present invention will be described with reference to the drawings.

Figure 4:
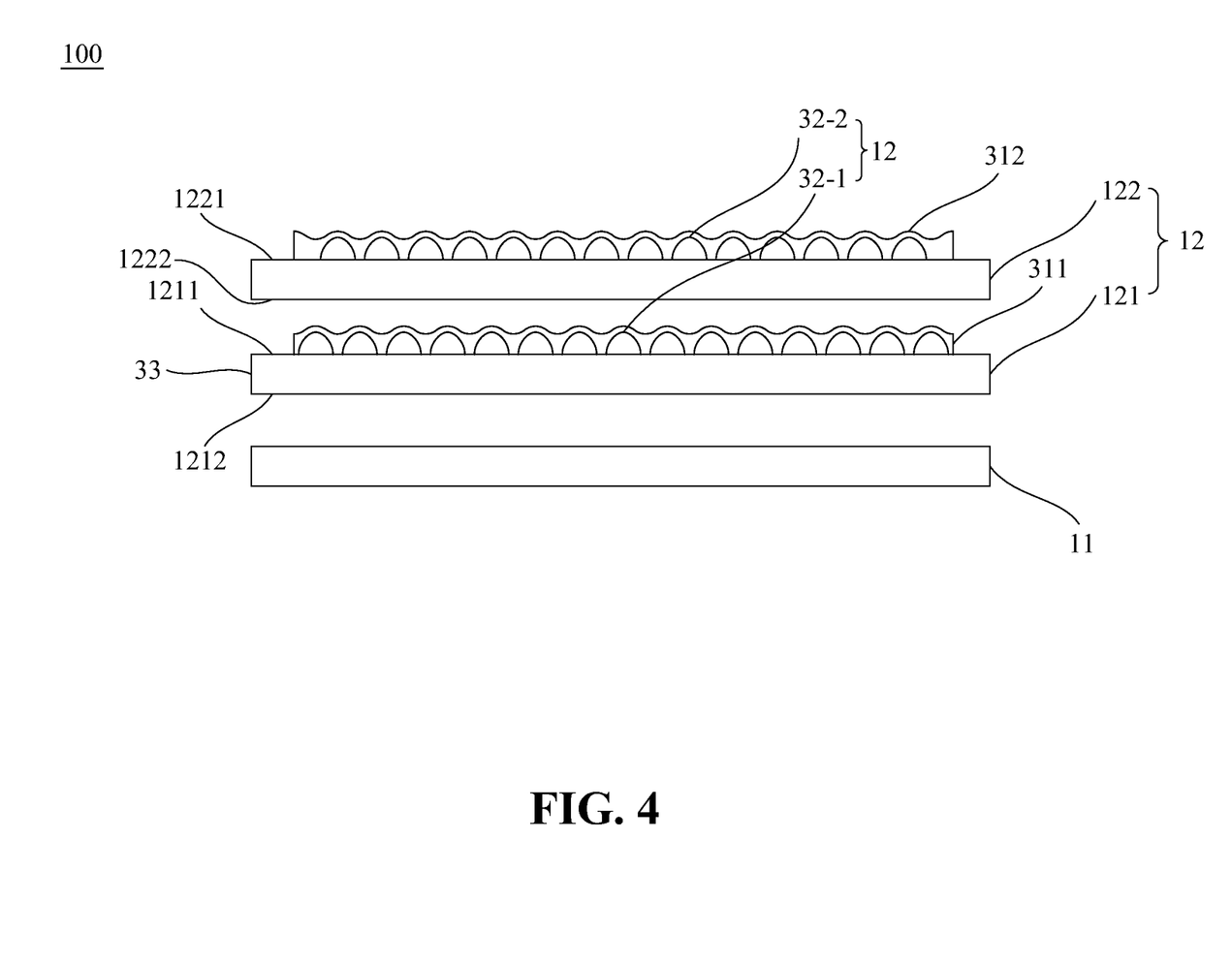
FIG. 4 is a schematic view of a surface light source projection device according to the first embodiment of the present invention.
Figure 5:
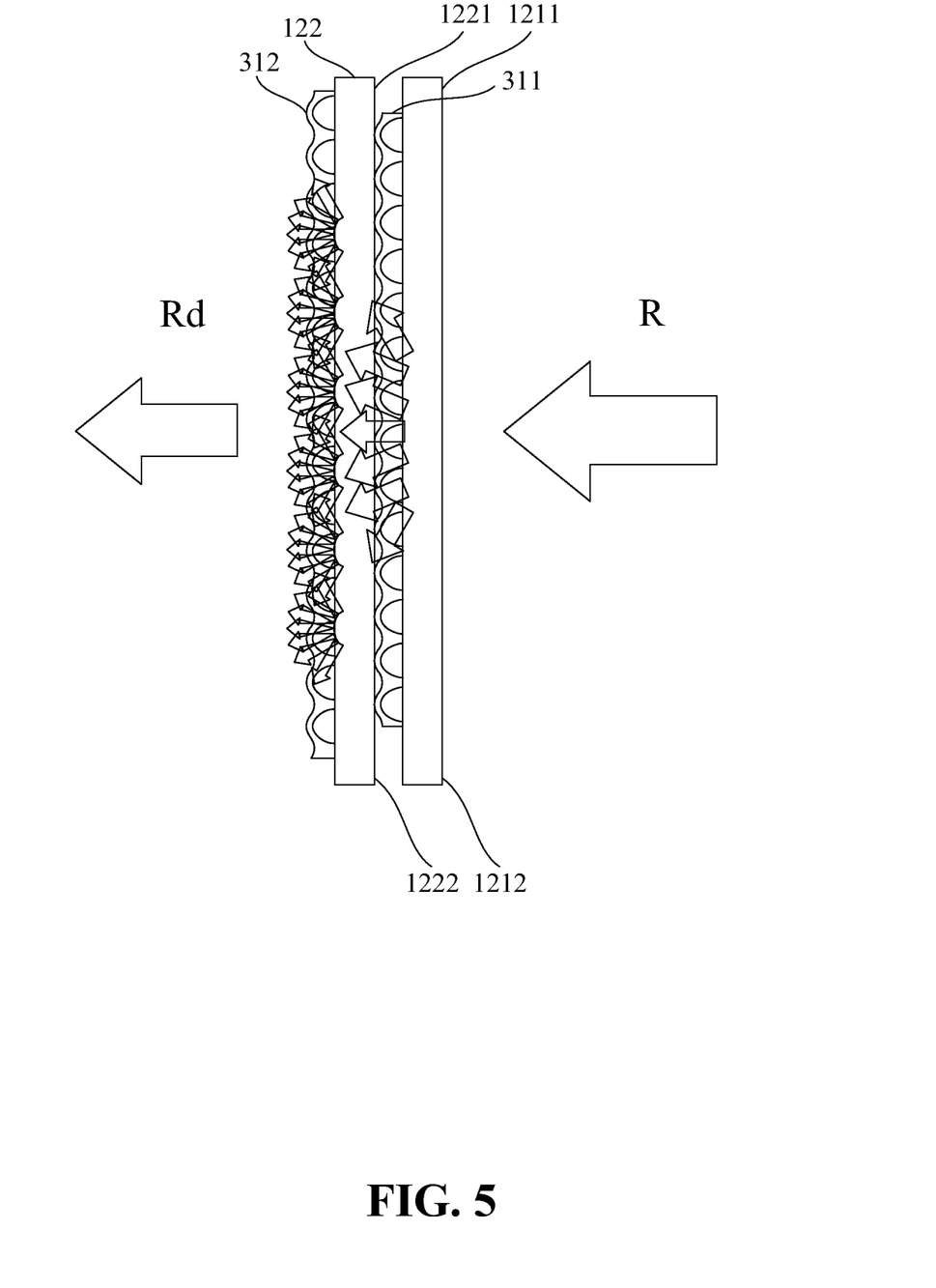
FIG. 5 is a schematic view of a diffractive optical element module according to the first embodiment of the present invention.

Refer to FIG. 4 and FIG. 5. FIG. 4 is a schematic view of a surface light source projection device according to the first embodiment of the present invention; FIG. 5 is a schematic view of a diffractive optical element module according to the first embodiment of the present invention. As shown in FIG. 4, the surface light source projection device 100 according to the first embodiment of the present invention is applied to a 3D sensing system. The surface light source projection device 100 includes a light exit module 11 and a diffractive optical element module 12. The diffractive optical element module 12 includes a first diffractive optical element 121 and a second diffractive optical element 122. The first diffractive optical element 121 is provided with a first micron diffraction layer 311, and the second diffractive optical element 122 is provided with a second micron diffraction layer 312, and both the first micron diffraction layer 311 and the second micron diffraction layer 312 have a plurality of microstructures 32, which are respectively a microstructure 32-1 and a microstructure 32-2. In addition, in the present embodiment, the diffractive optical element module 12 has a substrate 33, and the substrate 33 and the microstructure 32 are integrally formed.

Specifically, as shown in FIG. 4, the microstructures 32 of the first micron diffraction layer 311 and the second micron diffraction layer 312 of the diffractive optical element module 12 of the first embodiment of the present invention are integrally formed through an etching process. The material of the diffractive optical element module 12 is crystal, such as sapphire. Since sapphire is a material with high hardness and wear resistance, it can provide the diffractive optical element module 12 to maintain a stable optical In addition to the properties, as mentioned above, the lattice stacking of sapphire is also a hexagonal system, which can be used in conjunction with the microstructures 32 with the hexagonal close packed arrangement to further improve the spot density of the diffraction pattern formed by the diffracted light Rd. However, the present invention is not limited thereto.

Specifically, as shown in FIG. 4 and FIG. 5, the first diffractive optical element 121 of the first embodiment of the present invention has a first upper surface 1211 and a first lower surface 1212. In the present embodiment, the first lower surface 1212 is equivalent to the light incident surface 21 of the diffractive optical element module 12, and the first diffractive optical element 121 is provided with a first micron diffraction layer 311, and the first micron diffraction layer 311 is provided on the first upper surface 1211. The second diffractive optical element 122 of the first embodiment of the present invention has a second upper surface 1221 and a second lower surface 1222. In the present embodiment, the second upper surface 1221 is equivalent to the light exit surface 22 of the diffractive optical element module 12; the second diffractive optical element 122 is provided with a second micron diffraction layer 312, and the second micron diffraction layer 312 is provided on the second upper surface 1221. Specifically, in the present embodiment, the light beam R passes through the diffractive optical element module 12 to form a diffracted light Rd projected outwards, and the light beam R enters the diffractive optical element module 12 from the first lower surface 1212, the second upper surfaces 1221 outputs the diffracted light Rd, but the present invention is not limited thereto.

It is worth mentioning that, in the present embodiment, the microstructure 32-1 of the first micron diffraction layer 311 is completely the same as the microstructure 32-2 of the second micron diffraction layer 312 to ensure the light spots formed by the diffracted light Rd may have consistent light intensity of the light spots without overlapping, so as to ensure the accuracy of long-range sensing, but the present invention is not limited thereto.

Figure 6:
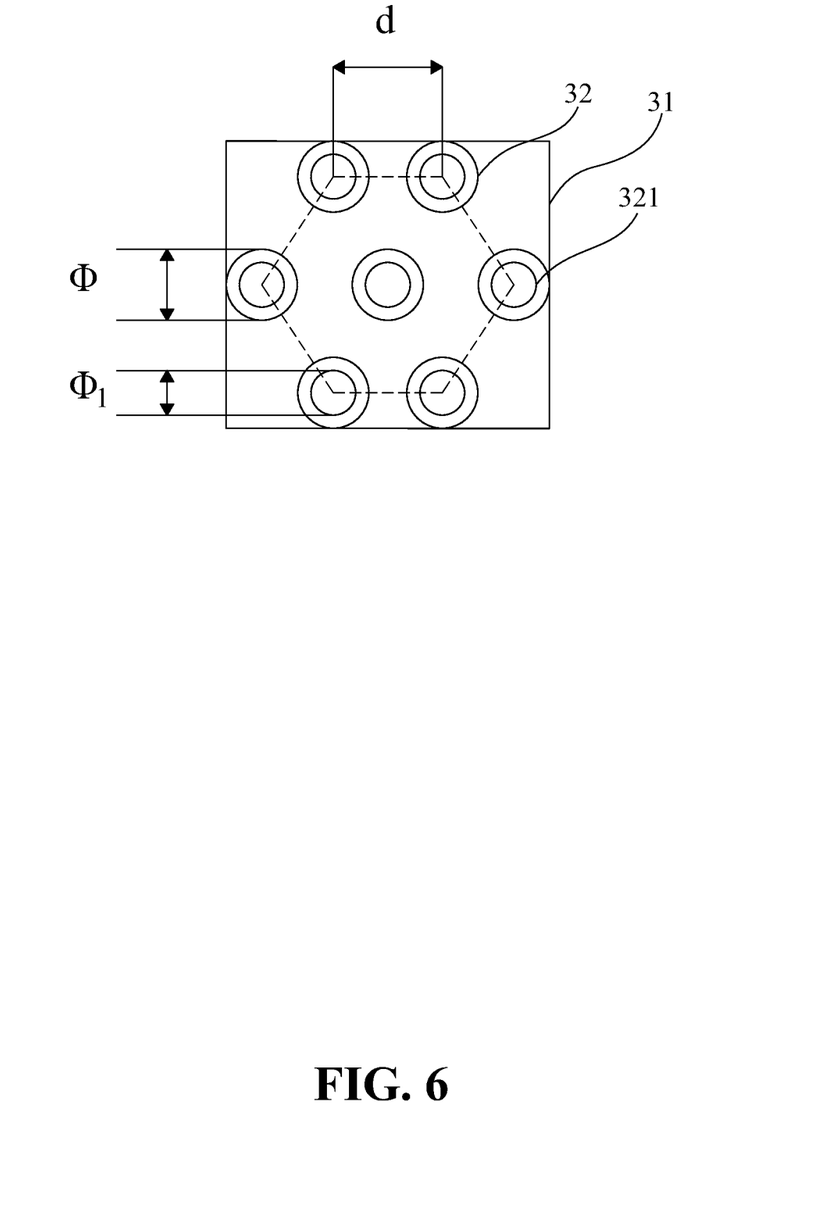
FIG. 6 is a schematic view of a microstructure according to the first embodiment of the present invention.
Figure 7:
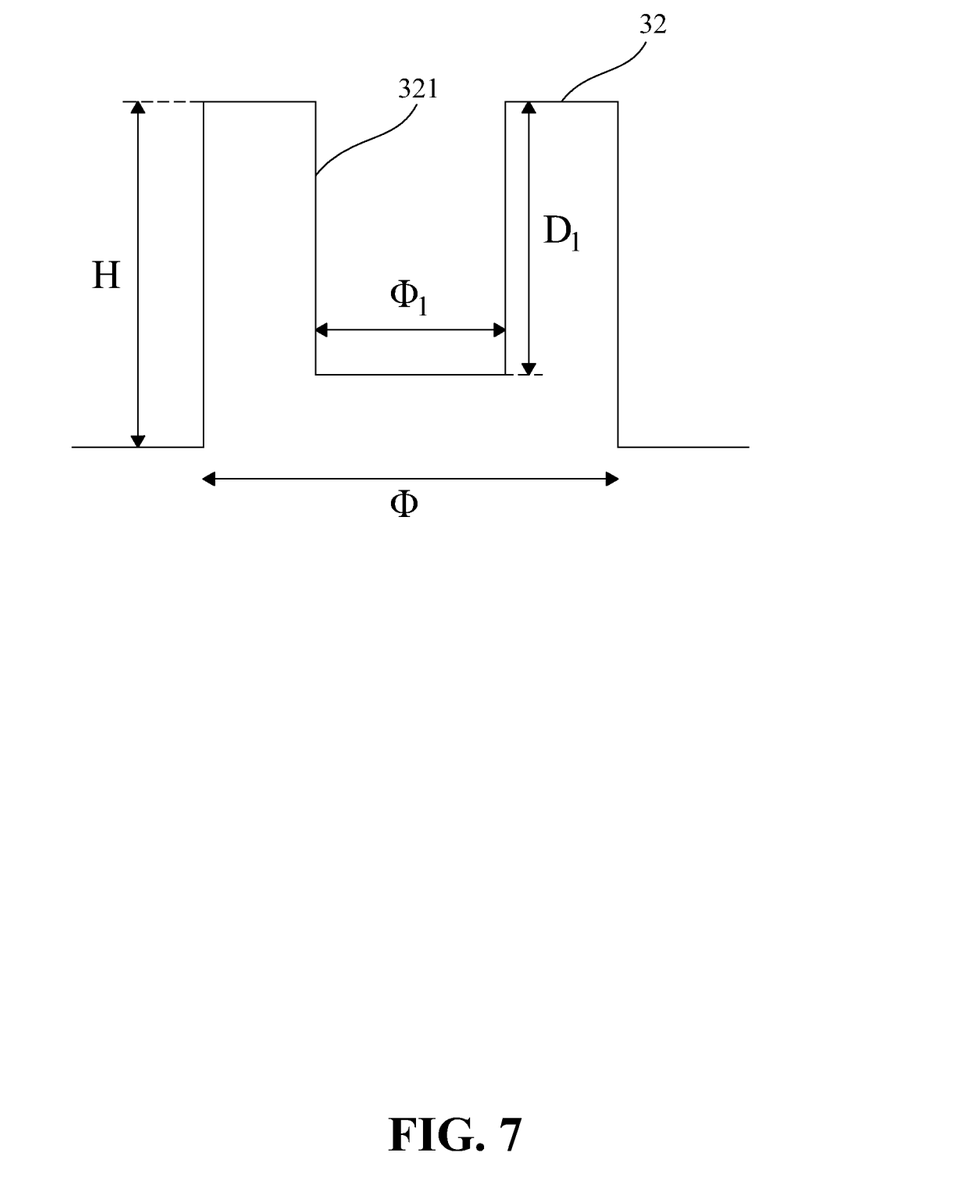
FIG. 7 is a schematic cross-sectional view of the microstructure according to the first embodiment of the present invention.

Specifically, referring to FIG. 6 and FIG. 7, FIG. 6 is a schematic view of the microstructure according to the first embodiment of the present invention; FIG. 7 is a cross-sectional schematic view of the microstructure according to the first embodiment of the present invention. As shown in FIG. 6 and FIG. 7, the microstructures 32 according to the first embodiment of the present invention are arranged in a hexagonal close packed arrangement, and the hexagonal close packed arrangement is an arrangement with the highest space utilization rate. The crystal material is also hexagonal close-packed, and the microstructure 32 is cylindrical, so that the diffraction pattern formed by the large diffracted light Rd has both uniform spot light intensity and high spot density, so as to improve the accuracy of long-range sensing degree of efficacy. Specifically, in the present embodiment, the microstructures 32 are provided with a first recess 321, and the first recess 321 has a first depth D1 and a first outer diameter $\phi 1$, wherein the total outer diameter $\phi$ of the microstructures 32 is between 5 times and 200 times the incident wavelength of the light beam R, the height H of the microstructures 32 is between 0.05 times and 0.2 times the total outer diameter $\phi$, and the height H of the microstructures 32 is between 0.05 times and 0.2 times the total outer diameter $\phi$. The spacing d is between 0.5 times and 5 times the total outer diameter $\phi$, and the first outer diameter $\phi 1$ of the recess 321 is between 0.3 and 0.7 times the total outer diameter $\phi$, and the first depth D1 of the first recess 321 is between 0.3 and 0.7 times the height H. As such, according to the surface light source projection device 100 of the first embodiment of the present invention, the intensity uniformity and the spot density of the light spot of the diffraction pattern formed by the diffracted light Rd are further enhanced, and the stability and accuracy of long-range sensing is improved.

It is worth mentioning that, the cross-section of the recess 321 may also be a curved shape instead of a straight shape. In other embodiments, the recess 321 can be set in a curved shape, and the curved recess 321 can further provide functions such as focusing or collimation. Users can choose which method is more appropriate according to the application. The present invention should not be interpreted as only limited thereto. In addition, the first outer diameter $\phi 1$ referred to herein can be the representation of the width of any recess 321. When the cross-section of the recess 321 is a straight line, the first outer diameter $\phi 1$ can be the length of the cross-section of the recess 321; when the microstructure 32 has a non-linear shape, the first outer diameter #1 can be represented by the length of the linear shape closest to the cross-section of the recess 321, but the invention is not limited thereto.

Figure 8:
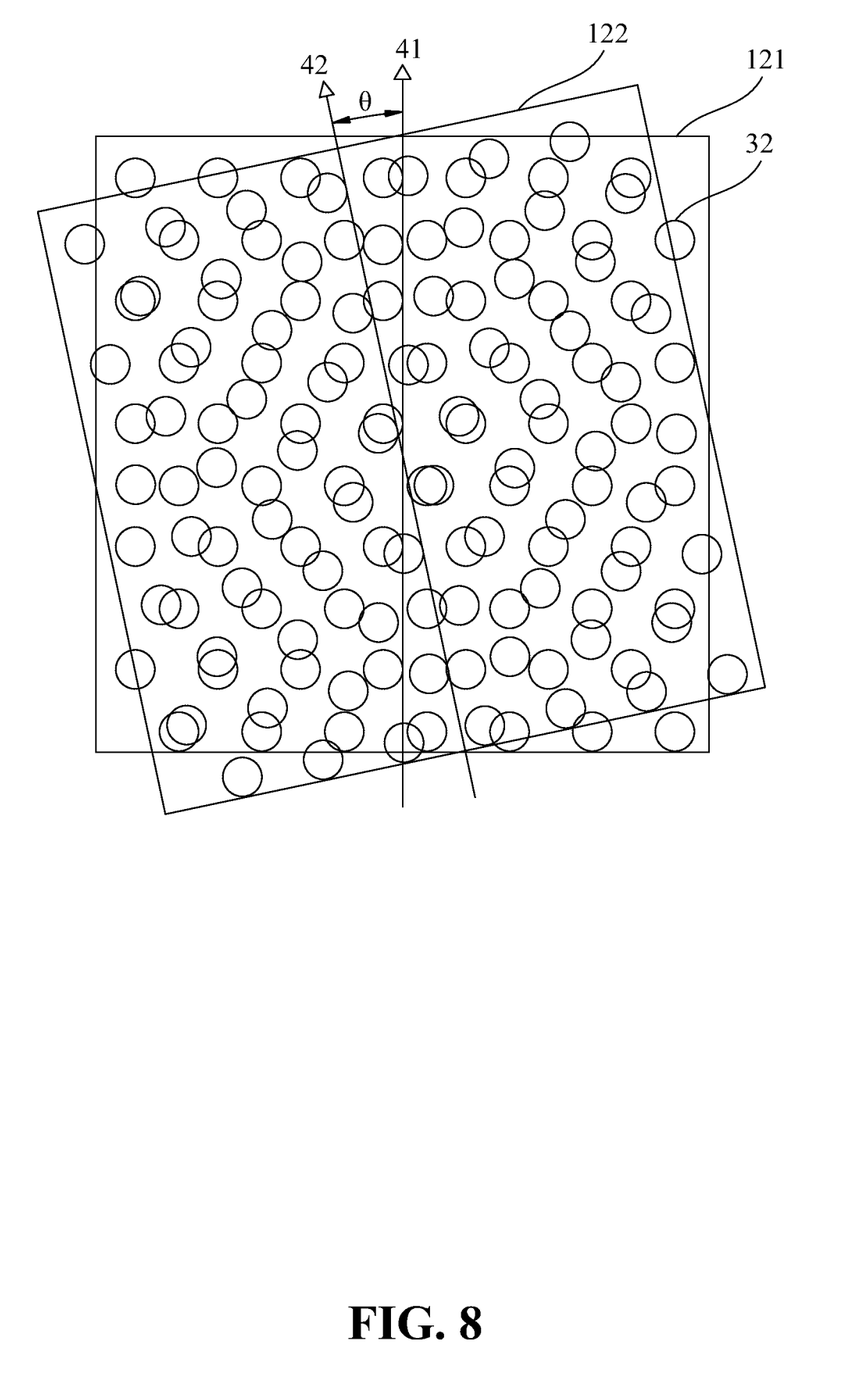
FIG. 8 is a schematic view illustrating an included angle between the first diffractive optical element and the second diffractive optical element.

Refer to FIG. 8, which is a schematic view illustrating an angle between the first diffractive optical element and the second diffractive optical element. As shown in FIG. 8, in the present embodiment, the center point of the first micron diffraction layer 311 is vertically aligned with the center point of the second micron diffraction layer 311. The second micron diffraction layer 312 rotates around the center point with respect to the first micron diffraction layer 311 by an angle θ, so that there is a relative angle θ between the first direction 41 passing through the center point of the first micron diffraction layer 311 and the second direction 42 passing through the center point of the second micron diffraction layer 312. Preferably, in the present embodiment, when the relative angle θ is 12 degrees, the diffracted light Rd can have the best spot intensity uniformity and spot density, but the present invention is not limited thereto.

It should be further noted that in the present embodiment, the relative angle θ is ideally 12 degrees. However, the embodiment of the present invention may be subject to the error of the measuring instrument. The relative angle θ between the first direction 41 and the second direction 42 is ideally in the range of 10 degrees to 14 degrees. However, the user may choose to measure the relative angle θ with a smaller error range according to the requirements, and the measured value may be smaller. This is only illustrative, and the present invention is not limited thereto. In addition, the relative angle θ referred to in the present invention can be defined as the light beam R measured in the infrared light range (for example, above 830 nm), and the first micron diffraction layer 311 and the second micron diffraction layer 312 are identical; or, for the convenience of description, the relative angle θ referred to in the present invention may define the light beam R to be measured at 940 nm.

Specifically, when the aforementioned method is used to adjust the relative angle θ between the first direction 41 passing through the center of the first micrometer diffraction layer 311 and the second direction 42 passing through the center of the second micrometer diffraction layer 312 to be 5 degrees, the spot distribution of the generated diffracted light Rd is a hexagonal diffraction pattern. The reason is that the crystal material of the first embodiment of the present invention is hexagonal close-packed, and at the same time, due to the overlapping arrangement of some of the light spots, i.e., diffraction spots, of the diffracted light Rd, the light spots with higher light intensity in the diffraction spots cover the light spot with lower light intensity, so as to make the intensity uniformity of the light spot formed by the diffracted light Rd poor. On the other hand, when the relative angle θ between the first direction 41 at the center of the first micrometer diffraction layer 311 and the second direction 42 at the center of the second micrometer diffraction layer 312 is 12 degrees, the resulting spot distribution of the diffracted light Rd is uniform. The reason is that in the present embodiment, the relative angle θ is adjusted to change the spot position of the diffracted light Rd to reduce the overlapping of the spots of the diffracted light Rd, thereby greatly increasing the intensity of the spot of the incident light Rd. The uniformity and the spot density can improve the sensing signal of long-range sensing and enhance the contour recognition of long-range sensing. It can be understood that the user can adjust the relative angle θ depending on the application, and the range of the relative angle θ can be between θ degrees and 90 degrees, for example, the relative angle θ can be 5 degrees, 10 degrees, and 20 degrees, etc. to determine what kind of diffraction pattern formed by the diffracted light Rd is suitable; however, the present invention should not be construed as being limited thereto.

Thereby, according to the surface light source projection device 100 according to the first embodiment of the present invention, the relative angle θ between the first micron diffraction layer 311 and the second micron diffraction layer 312 can be changed to adjust the relative positions of the microstructures 32 of the first micron diffraction layer 311 and the microstructures 32 of the second micron diffraction layer 312 so as to realize a diffraction pattern with a high density of dot matrix suitable for the time-of-flight ranging sensing system.

Other examples of the surface light source projection device are provided below to make possible variations more clearly understood by those skilled in the art to which the present invention pertains. Elements denoted by the same reference numerals as those of the above-described embodiments are substantially the same as those described above with reference to FIGS. 1 to 3. The same elements, features, and advantages as those of the surface light source projection device 100 will not be described again.

Figure 9:
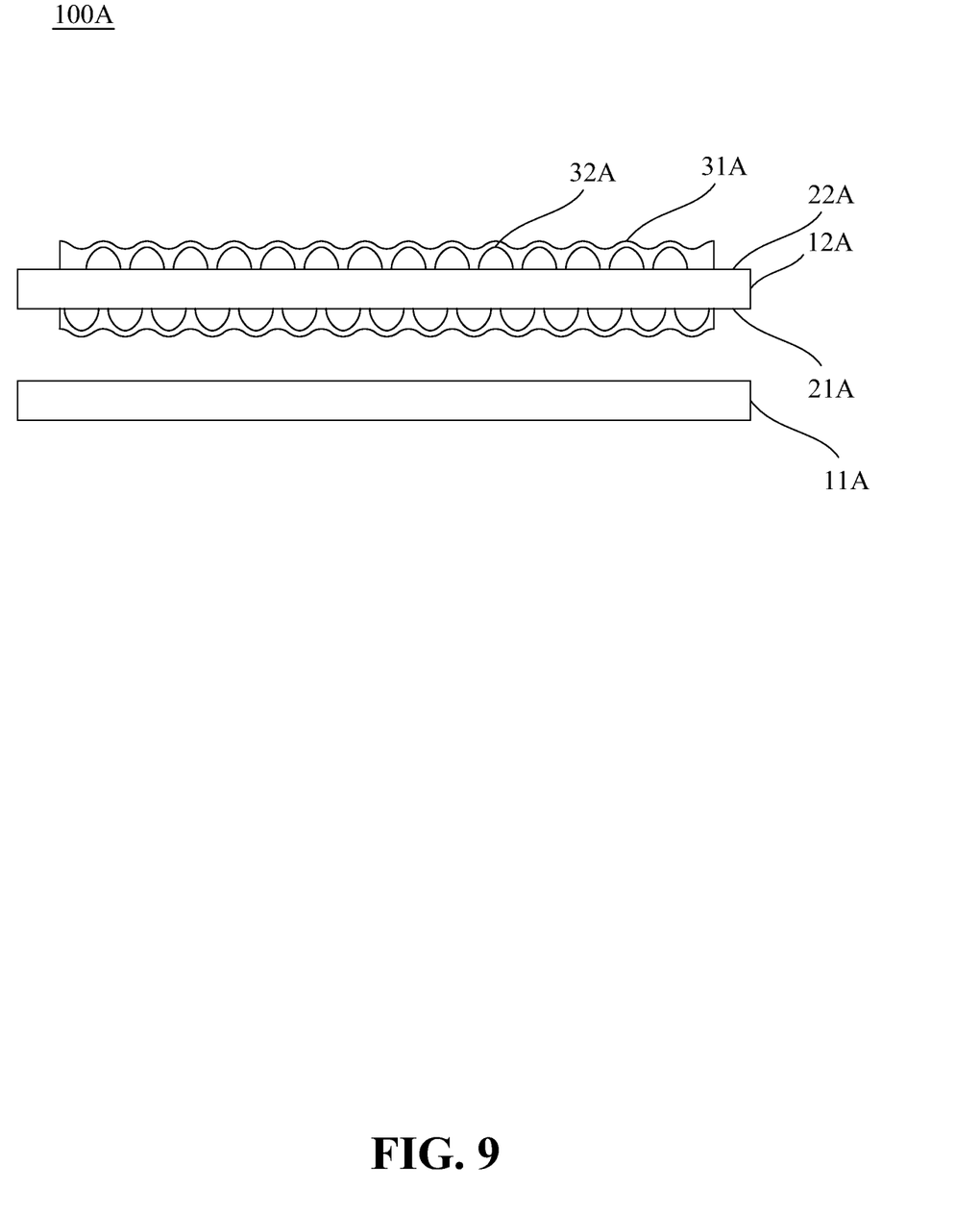
FIG. 9 is a schematic view of a diffractive optical element module according to a second embodiment of the present invention.

Specifically, refer to FIG. 9, which is a schematic view of a diffractive optical element module according to the second embodiment of the present invention. The difference between the surface light source projection device 100A of the second embodiment and the surface light source projection device 100 of the first embodiment is that in the present embodiment, the diffractive optical element module 12A of the surface light source projection device 100A is a single substrate structure. The micron diffraction layers 31A are respectively disposed on the light incident surface 21A and the light exit surface 22A of the diffractive optical element module 12A, and the micron diffraction layers 31A may have exactly the same microstructure 32A. In the present embodiment, the micron diffraction layer 31A can be disposed on one of the light incident surface 21A and the light exit surface 22A by etching. After the first micron diffraction layer 31A is disposed, the diffractive optical element the module 12A is rotated by the relative angle θ, and another micron diffraction layer 31A is disposed on the other one of the light incident surface 21A and the light exit surface 22A; but, the invention is not limited thereto.

Figure 10:
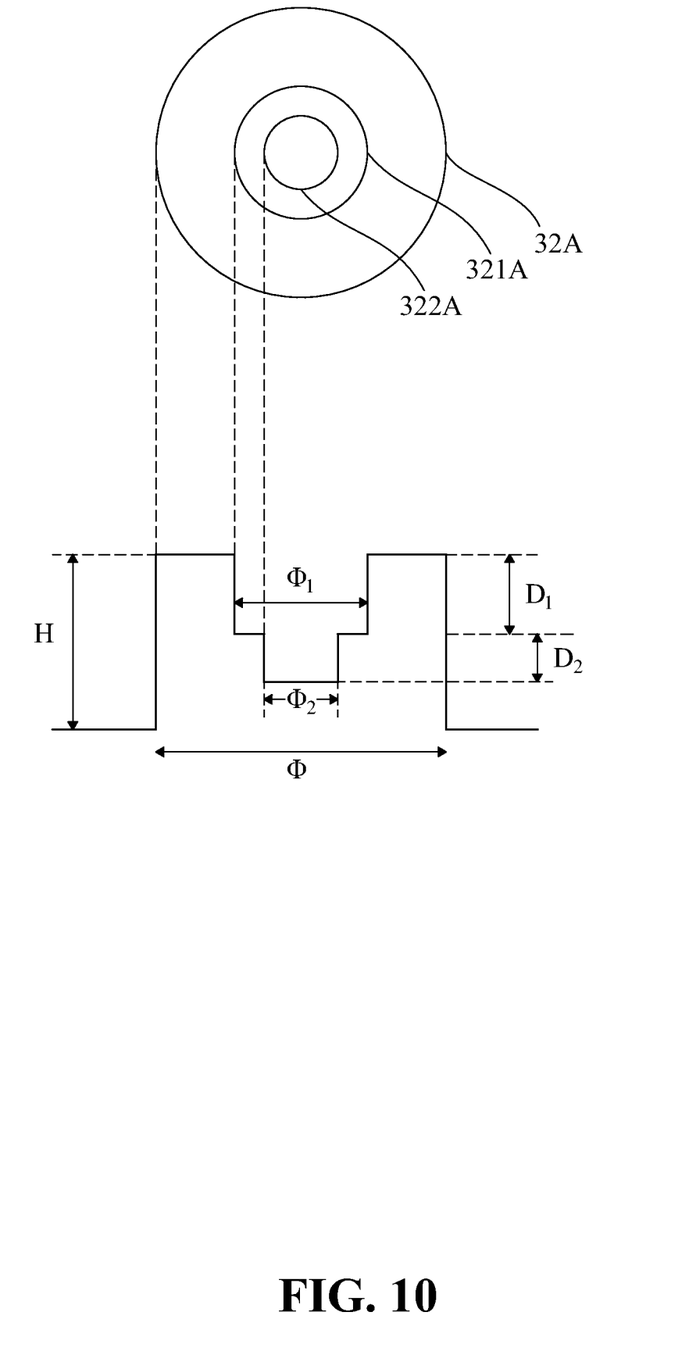
FIG. 10 is a schematic cross-sectional view of a microstructure according to the second embodiment of the present invention.

Specifically, refer to FIG. 10, which is a schematic cross-sectional view of the microstructure according to the second embodiment of the present invention. In the present embodiment, the microstructure 32A further includes a second recess 322A, the second recess 322A is disposed in the first recess 321A, the second recess 322A has a second depth D2 and a second outer diameter ϕ2, the second outer diameter ϕ2 of the recess 322A is between 0.3 and 0.7 times the first outer diameter ϕ1, and the second depth D2 of the second recess 322A is between 0.3 and 0.7 times the first depth D1. As such, the microstructure 32A of the second embodiment of the present invention further disperses the zero-order diffraction intensity of the diffraction pattern formed by the diffracted light Rd through the arrangement of the first recess 321A and the second recess 322A to avoid specific points with excessive brightness; therefore, the light spots of the diffraction pattern have the advantages of uniform light intensity and high density.

Figure 11:
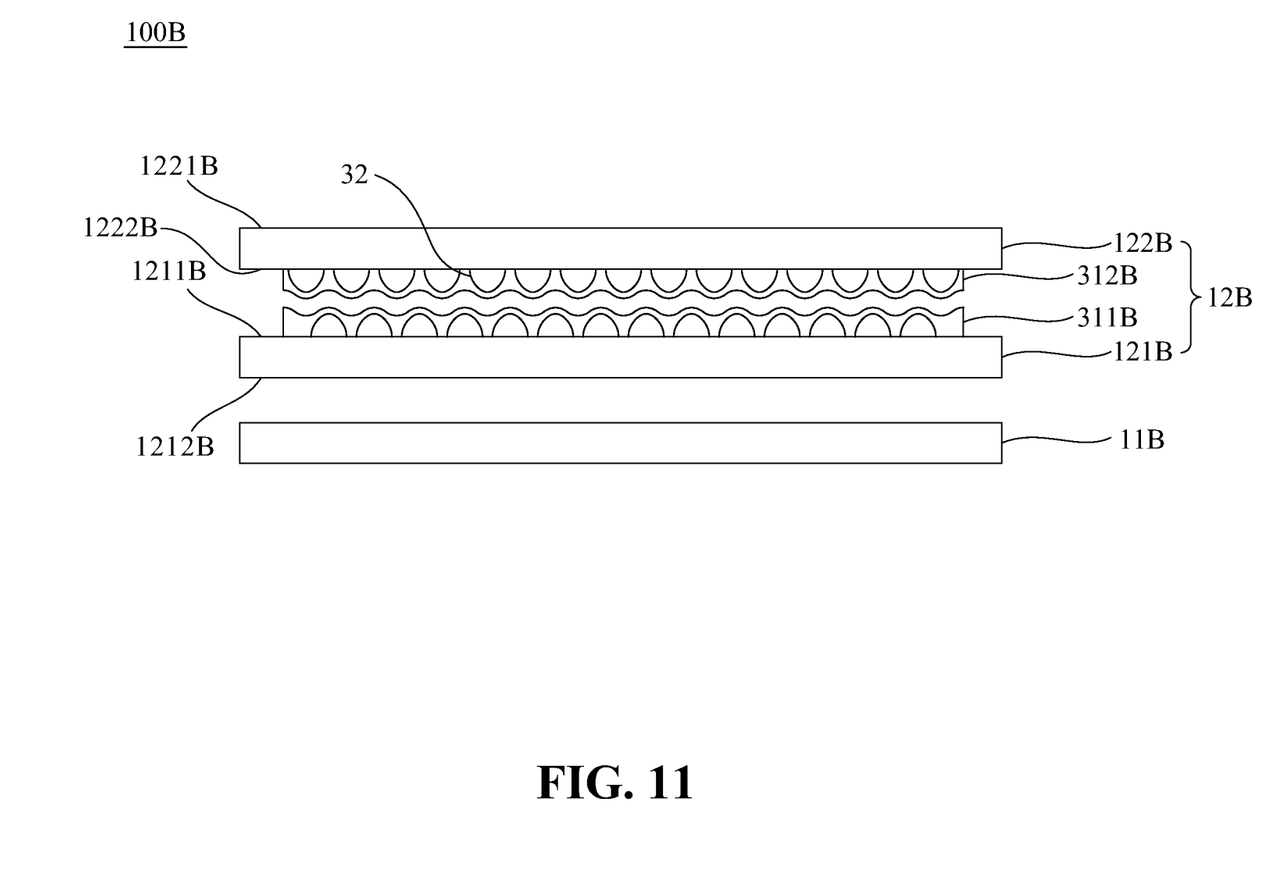
FIG. 11 is a schematic view of a diffractive optical element module according to a third embodiment of the present invention.

Specifically, refer to FIG. 11, which is a schematic view of the diffractive optical element module according to the third embodiment of the present invention. The difference between the surface light source projection device 100B of the third embodiment and the surface light source projection device 100 of the first embodiment is that in the present embodiment, the diffractive optical element module 12B of the surface light source projection device 100B has a first diffractive optical element 121B and a second diffractive optical element 122B. The first micron diffraction layer 311B is disposed on the first upper surface 1211B of the first diffractive optical element 121B, and the second micron diffraction layer 312B is disposed on the second lower surface 1222B of the second diffractive optical element 122B. It is worth mentioning that, in the present embodiment, the microstructures 32 of the first micron diffraction layer 311B and the second micron diffraction layer 312B are exactly the same to ensure that the light spot formed by the diffracted light Rd can have a consistent spot light intensity to ensure the accuracy of long-range sensing.

It can be understood that the disposition position of the second micron diffraction layer 312B will not greatly affect the diffracted light Rd formed by the surface light source projection device 100 and the light intensity uniformity and density of the light spot of the diffraction pattern formed by the diffracted light Rd, and those with ordinary knowledge in the technical field to which the present invention pertains can make various changes and adjustments based on the above examples, which will not be listed one by one here.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A surface light source projection device with improved zero-order diffraction, comprising:
    a diffractive optical element module, having a light incident surface and a light exit surface, and the diffractive optical element module being disposed with two micron diffraction layers, the micron diffraction layers comprising a plurality of microstructures, each of the microstructures being shaped conical, disc-shaped or any combination of the above with a circular perimeter, and the circular perimeter having a total outer diameter; and
    a light exit module, for outputting a collimated light beam, the collimated light beam having an incident wavelength, wherein the collimated light beam is incident on the light incident surface of the diffractive optical element module, and wherein the diffractive optical element module outputs a diffracted light from the light exit surface after the collimated light beam has passed through the diffractive optical element module;
    wherein each of the microstructures is formed with a first recess inside the circular perimeter, the first recess has a first depth and a first opening with a first outer diameter, the total outer diameter is between 5 times and 200 times the incident wavelength, and the first outer diameter is between 0.3 and 0.7 times the total outer diameter.

2. The surface light source projection device according to claim 1, wherein each of the microstructures has a height between 0.05 times to 0.2 times the total outer diameter, and the first depth of the first recess is between 0.3 and 0.7 times the height.

3. The surface light source projection device according to claim 1, wherein two adjacent microstructures have a distance between 0.5 times and 5 times the total outer diameter.

4. The surface light source projection device according to claim 1, wherein each of the microstructures further comprises a second recess formed inside the first recess, the second recess has a second depth and a second opening with a second outer diameter, the second outer diameter is between 0.3 and 0.7 times the first outer diameter, and the second depth is between 0.3 and 0.7 times the first depth.

5. The surface light source projection device according to claim 1, wherein the diffractive optical element module comprises a substrate, the micron diffraction layers are disposed on the substrate, the microstructures and the substrate are formed integrally by dry etching, and the substrate comprises transparent crystal or glass.

6. The surface light source projection device according to claim 1, wherein the micron diffraction layers are respectively a first micron diffraction layer and a second micron diffraction layer.

7. The surface light source projection device according to claim 6, wherein the first micron diffraction layer is disposed on the light incident surface of the diffractive optical element module, and the second micron diffraction layer is disposed on the light exit surface of the diffractive optical element module.

8. The surface light source projection device according to claim 6, wherein the diffractive optical element module comprises:

a first diffractive optical element, the first diffractive optical element having a first upper surface and a first lower surface; and a second diffractive optical element, the second diffractive optical element having a second upper surface and a second lower surface;

wherein, the first micron diffraction layer is disposed on the first upper surface of the first diffractive optical element, the second micron diffraction layer is disposed on the second diffractive optical element, and the collimated light beam is incident on the diffractive optical element module from the first lower surface, passes through the diffractive optical element module, and then exits as the diffracted light from the second upper surface.

9. The surface light source projection device according to claim 8, wherein the second micron diffraction layer is disposed on the second lower surface.

10. The surface light source projection device according to claim 8, wherein the second micron diffraction layer is disposed on the second upper surface.

* * * * *